June 30, 1964  J. R. URSCHEL ETAL  3,139,129
METHOD OF SLICING A FOOD PRODUCT
Original Filed June 29, 1959  7 Sheets-Sheet 1
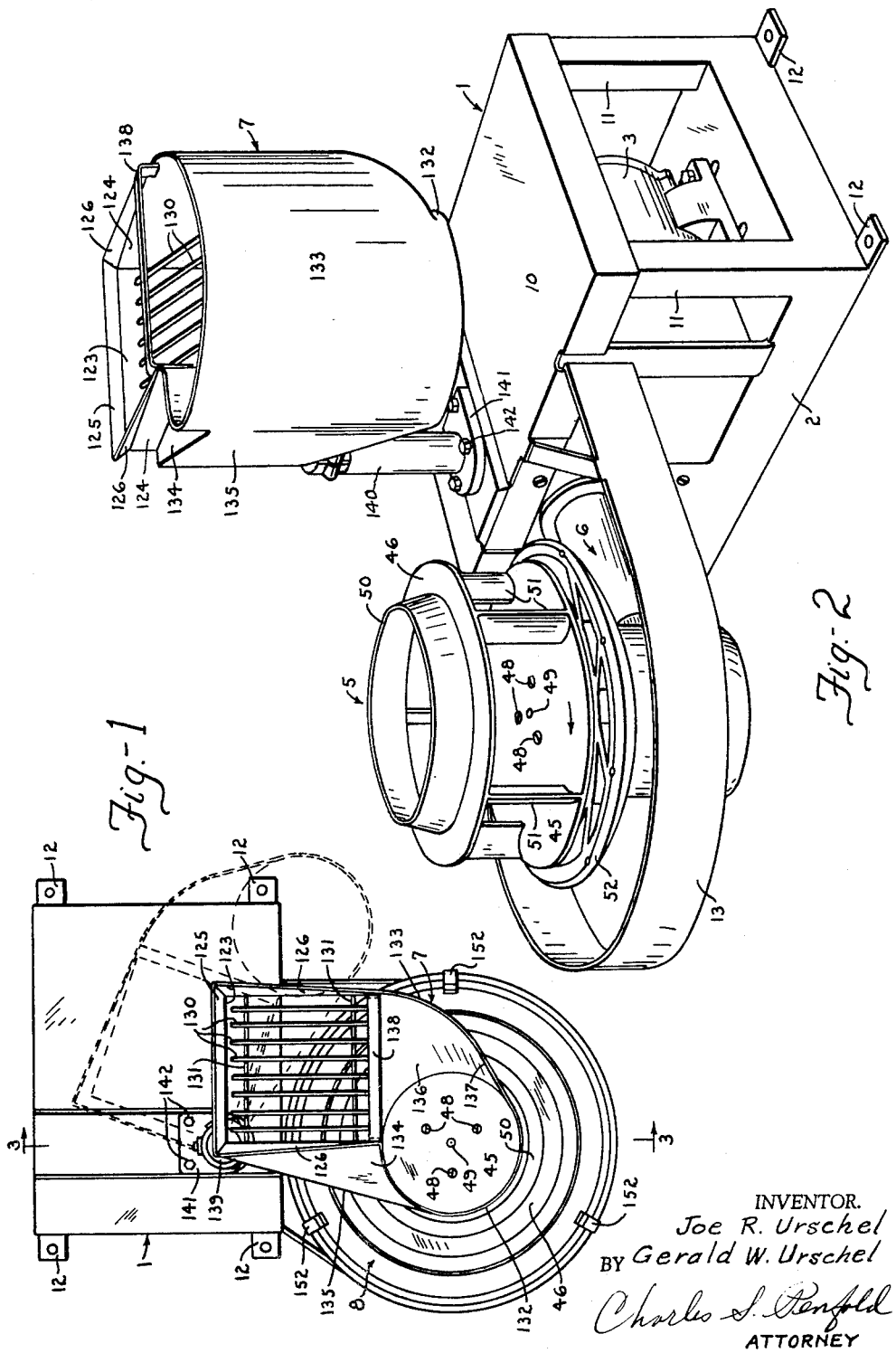
INVENTOR.
Joe R. Urschel
BY Gerald W. Urschel
Charles S. Penfold
ATTORNEY

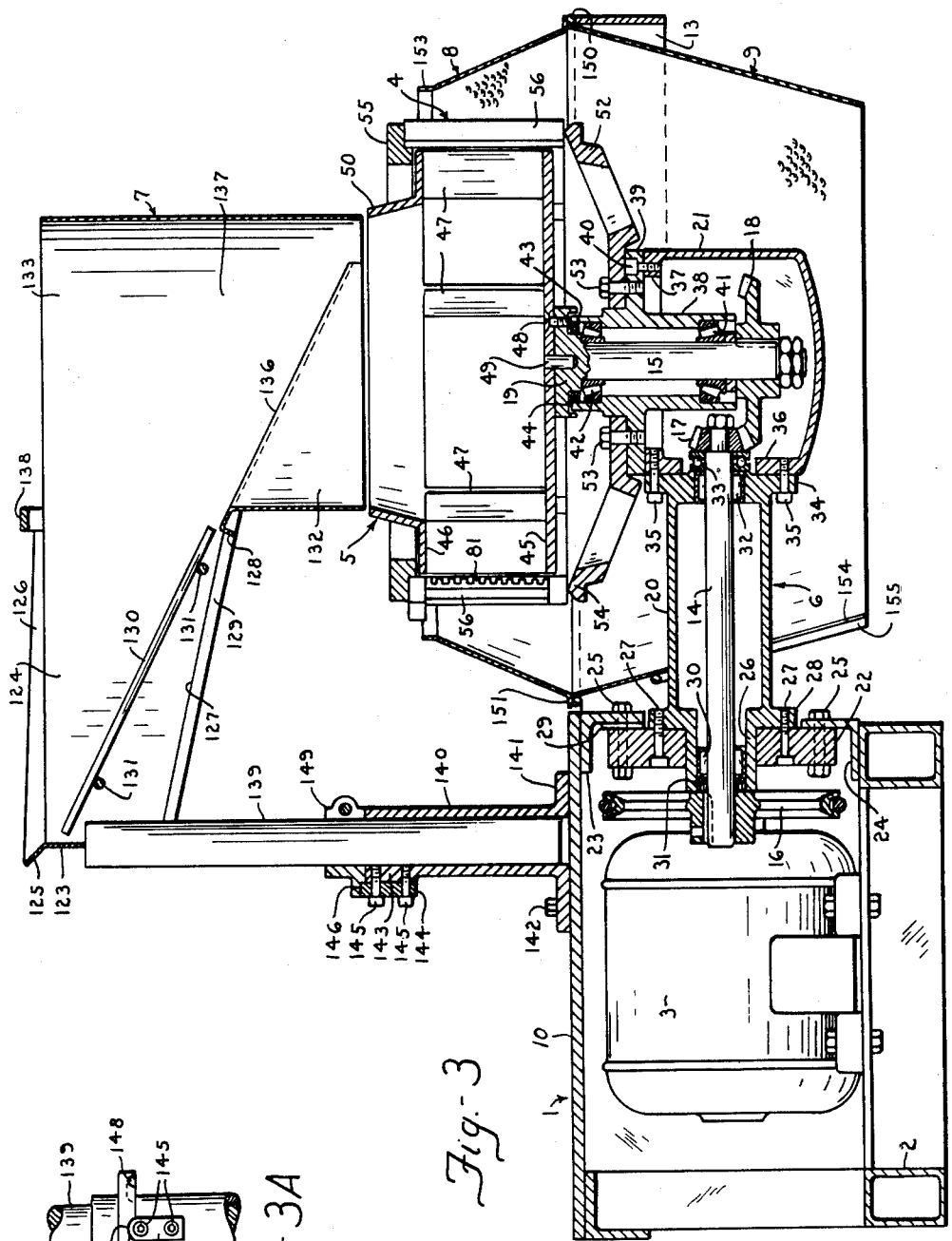

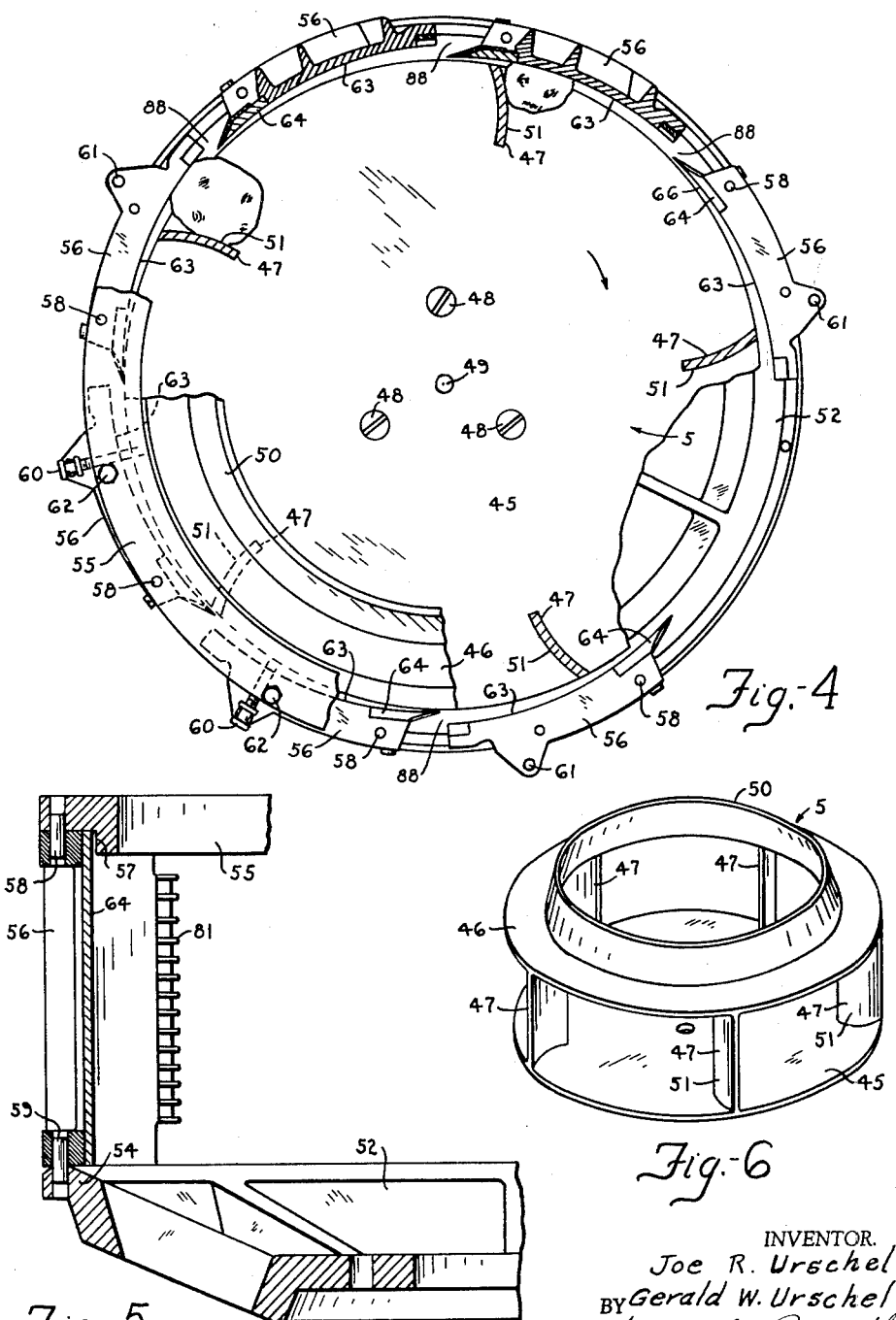

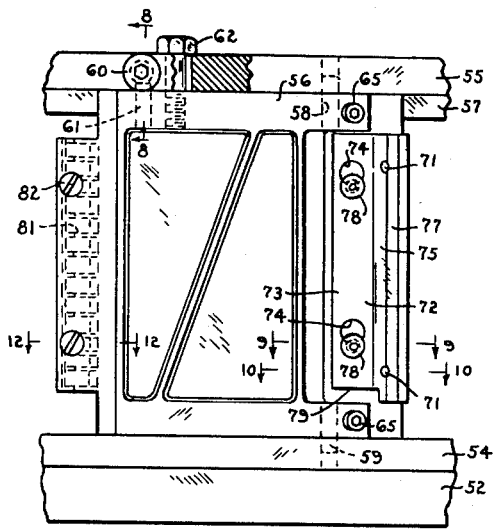

INVENTOR.
Joe R. Urschel
BY Gerald W. Urschel
Charles S. Penfold
ATTORNEY

June 30, 1964  J. R. URSCHEL ETAL  3,139,129
METHOD OF SLICING A FOOD PRODUCT
Original Filed June 29, 1959  7 Sheets-Sheet 6
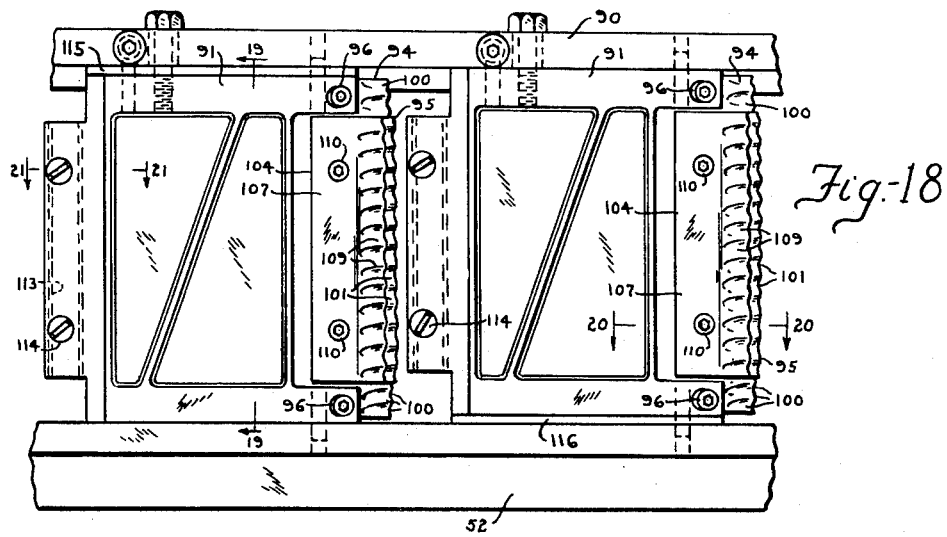
Fig.-18
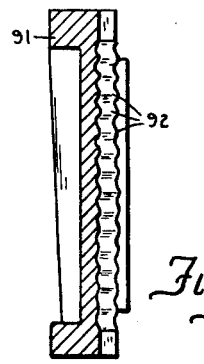
Fig.-19
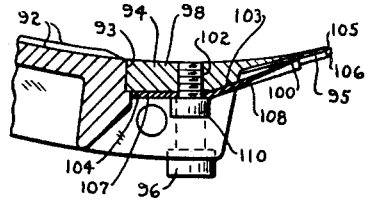
Fig.-25    Fig.-20
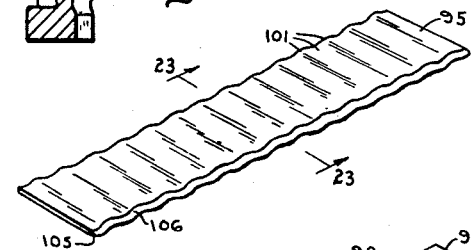
Fig.-22
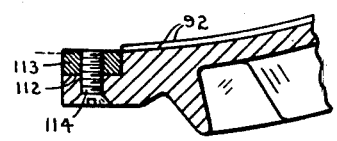
Fig.-21
Fig.-23
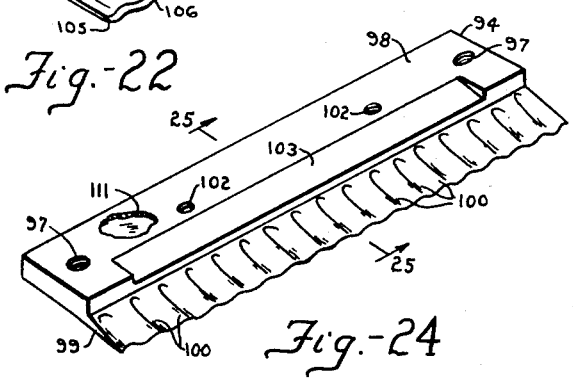
Fig.-24
INVENTOR.
Joe R. Urschel
BY Gerald W. Urschel
Charles S. Penfold
ATTORNEY INVENTOR.
Joe R. Urschel
BY Gerald W. Urschel
Charles S. Penfold
ATTORNEY

United States Patent Office 3,139,129
Patented June 30, 1964

3,139,129
METHOD OF SLICING A FOOD PRODUCT
Joe R. Urschel, 202 Michigan Ave., and Gerald W. Urschel, 1614 Napoleon, both of Valparaiso, Ind.
Original application June 29, 1959, Ser. No. 823,524. Divided and this application Jan. 16, 1963, Ser. No. 251,805
4 Claims. (Cl. 146—241)

The subject invention relates generally to equipment for processing food and more particularly is directed to a machine and method for cutting products such as potatoes, beets and the like, into slices.

The subject application is a division of an application, Serial No. 823,524, filed June 29, 1959, now abandoned.

One of the principal objects of the invention is to provide a machine for the above purpose which comprises, among other things, a stationary annular cutter assembly or slicer head and an annular carriage or impeller unit which is concentrically arranged for rotation in the cutter assembly for successively delivering the product to circumferentially spaced knives on the cutter assembly.

Another object of the invention is to provide the cutter assembly with a plurality of circumferentially spaced supports or shoes which carry the knives and improved means for selectively adjusting the supports of the assembly in a manner whereby the thickness of the slice to be cut may be gauged or determined. The spaced supports and knives thereon are so constructed and arranged that the product is slidably presented to the knives in a smooth and uninterrupted manner.

A significant objective of the invention is to provide the spaced supports of the cutter assembly with pressure members or inserts remote from the knives and the carriage with a plurality of vertical blades or vanes which are curved to present cam surfaces which, in combination with inturned abutment surfaces provided on the pressure members, serve to stabilize and compress to some extent the product as it is being successively conveyed to and cut by the knives and thereby promote uniformity in the thickness of the slices.

A particular object of the invention is to provide at least two cutter assemblies for cutting different forms or types of slices, such as plain, corrugated and strips, including improved means whereby such assemblies can be readily selectively mounted in place.

A specific object of the invention is to provide each of the cutter assemblies with relatively inexpensive knives, more or less of the razor blade type, which can be readily replaced and accurately adjusted for efficient cutting of the product. In the assembly for cutting plain slices normally planar knives are compressed out of their shape to impart stability thereto while the other assembly employs corrugated knives which may be adjusted with respect to one another to obtain various forms of corrugated slices or chips as well as different forms of strips.

An additional object of the invention is to provide pressure members or inserts which are grooved or ribbed for use with the assembly for cutting plain slices and pressure members which are flat for use with the assembly adapted to cut corrugated slices and strips. These members are so designed and constructed that they may be reversibly mounted to prolong their life and provide a setup whereby foreign matter, such as small gravel and sand, may be discharged from the assembly ahead of the knives and thereby prevent damage thereto.

An important object of the invention is to provide improved means for operatively connecting the carriage with a power unit, means for attaching the carriage on a part of the connecting structure, and a mounting secured to means housing the connecting means for supporting either cutter assembly.

Another object of the invention is to provide a hopper embodying improved principles of design and construction whereby foreign material, such as stones, pebbles and the like which have not previously been removed, will be substantially discharged from the hopper and away from the cutter assembly. This discharge is preferably achieved by providing the hopper with a grate through which the foreign material may fall as the product is fed into the hopper. The hopper is also provided with a surface for guiding the products in a circuitous path substantially directly between the blades of the carriage and thereby substantially reduce mashing and bruising of the product.

A further object of the invention is to provide a setup whereby fittings may be detachably connected to the blades of the carriage in order to further assist in stabilizing the position of the product as it is being carried and severed.

Other objects of the invention reside in providing a machine comprised of various subassemblies which offer advantages with respect to their manufacture and assembly, durability, and efficiency in operation.

Additional objects and advantages of the invention will become apparent after the description hereinafter set forth is considered in conjunction with the drawings annexed hereto.

In the drawings:

FIGURES 1 through 17 are directed to structure which is utilized to cut a product into plain slices; FIGURES 18 through 25 to a cutter assembly whereby a product can be severed into various forms of slices or chips as depicted in FIGURES 26 and 27 or into strips as exemplified in FIGURES 28, 29 and 30; and FIGURES 31 and 32 show fittings which may be attached to blades of the carriage unit to further assist in holding the product in place while being cut;

More particularly, FIGURE 1 is a top or plan view of the machine embodying the invention or inventions;

FIGURE 2 is an enlarged perspective view of the structure illustrated in FIGURE 1 with certain subassemblies removed;

FIGURE 3 is a longitudinal section view taken substantially on line 3—3 of FIGURE 1;

FIGURE 3A is a partial elevational view of the means utilized to locate the hopper in either of two positions;

FIGURE 4 is an enlarged top view of the carriage unit and one form of a cutter assembly surrounding the unit, with portions broken away to illustrate details of their structures;

FIGURE 5 is a partial vertical section taken through the cutter assembly and support on which this assembly is mounted;

FIGURE 6 is a pictorial view of the carriage unit;

FIGURE 7 is a side elevational view of a part of the cutter assembly used to cut plain slices of a product, and illustrates certain structural features of each support thereon which carries a knife and pressure member and related components;

FIGURE 8 is an enlarged partial vertical section taken substantially on line 8—8 of FIGURE 7, showing a means for adjusting each support;

FIGURE 9 is an enlarged transverse section taken substantially on line 9—9 of FIGURE 7, showing details with respect to mounting each knife;

FIGURE 10 is an enlarged transverse section, similar to FIGURE 9, taken substantially on line 10—10 of FIGURE 7;

FIGURE 11 is a perspective view of one of the pressure members which is used when plain slicing of the product is desired;

FIGURE 12 is an enlarged transverse section taken substantially on line 12—12 of FIGURE 7, showing the mode of attaching each pressure member shown in FIGURE 11 to a support;

FIGURE 13 is a perspective view of a planar knife adapted for use with the structure as best shown in FIGURES 4, 7, 9 and 10;

FIGURE 14 is a perspective view of a clamp utilized in holding the knife above referred to in place on a support, with a portion of a coating on the clamp in section;

FIGURE 15 is an enlarged transverse section taken substantially on line 15—15 of FIGURE 13;

FIGURE 18 depicts a portion of a cutter assembly showing two supports, each being provided with a corrugated knife, including a holder and a clamp therefor, and means whereby the supports may be alternately disposed at different elevations to obtain various forms of slices and strips;

FIGURE 19 is a vertical section taken substantially on line 19—19 of the left support in FIGURE 18;

FIGURE 20 is an enlarged transverse section taken substantially on line 20—20 of FIGURE 18 and shows the mode of mounting a corrugated knife between a holder and clamp therefor;

FIGURE 21 is a transverse section taken substantially on line 21—21 of FIGURE 18 and depicts a planar type of pressure member associated with each support;

FIGURE 22 is a perspective view of one of the eight corrugated knives used in the assembly of FIGURE 18;

FIGURE 23 is a transverse section taken substantially on line 23—23 of FIGURE 22;

FIGURE 24 is a perspective view of one of the eight holders for the corrugated knives;

FIGURE 25 is a transverse section taken substantially on line 25—25 of FIGURE 24;

Figure 16:
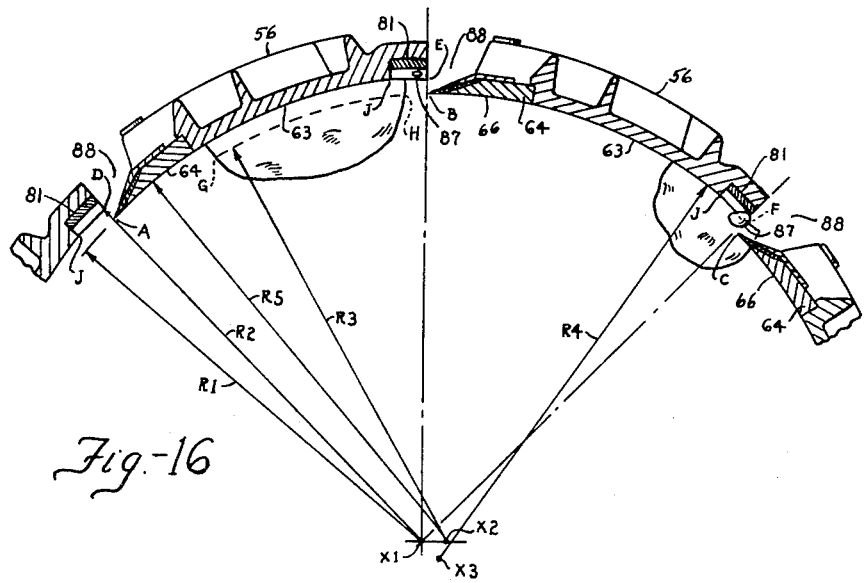
FIGURE 16 is a partial horizontal section of the cutter assembly illustrating the various radii utilized to locate the supports and knives and pressure members in a predetermined operative relationship to achieve uniform slicing of the product.

Referring briefly to the main components or subassemblies of the machine illustrated in FIGURES 1, 2 and 3 of the drawings, numeral 1 generally designates a substantial frame having a base 2 which supports a power unit 3; 4 a stationary cutter assembly supported from the frame; 5 a rotatable carriage disposed in the cutter assembly for feeding the product to the cutter assembly; 6 means operatively connecting the power unit with the carriage; 7 a hopper pivotally mounted above the carriage for delivering the product to be cut into the carriage; 8 a guide or discharge ring disposed about the cutter assembly; and 9 a funnel for directing the cut product into a container adapted for disposition therebelow.

The machine may be mounted where desired, depending on its use, but it is preferably utilized to cut potatoes into slices or strips and is adapted to be firmly mounted on a suitable superstructure over a tank containing water or other solution, constituting a component of a system, such as a system for frying the potatoes. A bucket elevator or other suitable conveyor, in combination with a chute at the delivery end of the conveyor, is preferably employed to feed the product into the hopper 7 above referred to. A pipe is preferably located above the machine for continuously delivering a small stream of water into the carriage in order to free the carriage and cutter assembly from any accumulation of starch and promote the flow of the product therethrough. The tank and superstructure therefor, bucket and chute, and the water pipe are not illustrated as they are of a conventional character. The organization thus offers a setup whereby the product may be continuously fed through the cutter assembly of the machine so that the portions or segments cut from the product will fall into the tank.

The frame, generally designated 1, may be designed and constructed in various ways, but as exemplified herein it includes the base 2, above referred to, a platform 10 supported above the base by a plurality of corner legs 11 and reenforcing members to provide a stable rectangular frame structure. The base is preferably provided with apertured lugs 12 through which fastening means may be extended for anchoring the machine in place. A substantially U-shaped member 13 extends laterally in a horizontal plane from one side of the frame and, among other things, serves to support the guide 8 and the funnel 9.

The power unit 3 is preferably in the form of an electric motor mounted on the base 2 and the means generally designated 6 for operatively connecting this unit and the rotatable carriage 5 may be constructed as desired but as exemplified, particularly in FIGURE 3, includes a horizontal shaft 14 extending laterally from the frame and a vertical shaft 15 geared to the horizontal shaft. The inner end of the horizontal shaft is provided with a relatively large pulley 16 having a belt thereon which is driven from a smaller pulley (not shown) carried by the motor shaft. The outer end of the horizontal shaft is provided with a small spiral bevel gear 17 which meshes with a larger bevel gear 18 keyed to the lower end of the vertical shaft. The upper end of the vertical shaft is provided with an annular head 19 on which the carriage 5 is detachably secured.

As depicted in FIGURE 3, the horizontal shaft is substantially journalled in a cylindrical casing or housing 20 and the vertical shaft in a housing 21 attached to the casing. The casing 20 is carried by a mounting plate 22 which in turn is connected to an upper horizontal bar 23 and a lower horizontal bar 24, the latter being anchored to one side of the frame of the machine. The bars are constructed from strong metal stock and the plate 22, which is relatively thick, is detachably supported by bolts 25 within the confines of the frame against the inner sides of the bars. The casing is provided with a reduced inner end portion 26 which is firmly secured in a central opening provided in the plate by screws 27 which extend through the plate and engage threaded apertures provided therefor in a radially extending annular flange 28 formed on the casing at the base of its reduced portion. It is to be noted that the inner side of this flange and the inner side of a shoulder formed by the reduced portion provide a relatively large bearing surface which engages the outer side of the mounting plate and that the thickness of the plate and the cross-sectional dimension and length of the reduced portion of the casing contribute to firmly anchor the casing on the frame. A spacer member 29 may be interposed between the upper bar 22 and the plate to assist in accurately positioning the connecting means 6 so that the head 19 on the vertical shaft is level for properly supporting the carriage.

The reduced portion 26 of the casing preferably extends inwardly beyond the mounting plate 22 and is engaged by the hub of the pulley 16 for spacing the pulley a predetermined distance away from the plate for clearance purposes. The pulley is preferably detachably secured to the horizontal shaft 14 by a set screw which extends through the hub of the pulley. A suitable roller bearing assembly 30 and an oil seal 31 are disposed in the reduced portion 26 of the casing 20 for supporting the inner extremity of the horizontal shaft and the outer end of the casing is formed with a thick end wall having an opening therein within which is seated a roller bearing assembly 32 for supporting the outer extremity of the shaft. An end thrust ball bearing assembly 33 for the horizontal shaft is interposed between the small gear 17 and the thick end wall of the casing 20. The gear 17 is secured to a reduced end of the horizontal shaft in a conventional manner.

The thick end wall of the casing is also formed with a radical extending annular flange 34 through which screws 35 extend into threaded apertures provided in a vertical planar wall 36 of the housing 21 for detachably connecting together the casing and housing. The vertical wall is also provided with a clearance opening for the horizontal shaft and the ball bearing assembly 33. The housing is preferably constructed in the form of a cup and includes a top wall 37 having a clearance opening therein through which a cylindrical tubular member 38 depends. This tubular member is provided with an annular flange 39 which is detachably secured upon the top wall 37 of the housing by a plurality of screws 40, only one of which screws is shown in FIGURE 3, with its head disposed within the confines of the flange. The lower end of the tubular member 38 is preferably counter-bored and receives a tapered roller bearing assembly 41 for journalling the lower extremity of the vertical shaft 15 and the upper end of the tubular member is similarly counter-bored and receives a tapered roller bearing assembly 42 for the upper extremity of the shaft. An oil seal 43 is also seated in the aforesaid counter-bore. The casings or housings 20 and 21 are sealed and adapted to contain oil for lubricating the movable components therein and the housing 21 is provided with a suitable refill opening and a discharge opening (not shown).

It will be noted that the underside of the head 19 of the vertical shaft is provided with an annular groove 44 which receives the upper end of the tubular member 38 so that a lip or skirt of the head extends downwardly in embracing relationship with the upper end in order to prevent accidental entry of pieces of the cut product and/or juice therefrom into the member.

The carriage 5 may be designed and constructed in various ways but the form or embodiment clearly illustrated, particularly in FIGURES 2, 3, 4 and 6, includes a horizontal planar bottom wall 45, a horizontal planar top wall 46, and a plurality of five corresponding vertical blades or vanes 47 which join these walls. The carriage is preferably detachably connected to the head 19 of the vertical shaft for rotation therewith by a plurality of three headed screws 48 which extend through the bottom wall of the carriage into threaded holes provided therefor in the head with the heads of the screws being flush with the upper surface of the head so they will not damage any product falling into the carriage. The head is also provided with a center hole in which a pin 49 is disposed for entry into a center aperture in the bottom wall of the carriage for locating purposes.

Figure 17:
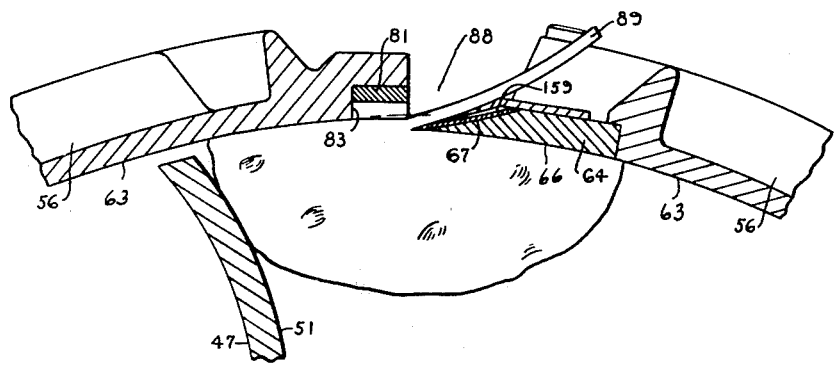
FIGURE 17 is an enlarged view of a part of the structure shown in FIGURE 16, with portions in section, and depicts the important operative relationship between a knife on one support and a pressure member on an adjacent support.

The top wall 46, preferably in the form of a ring, is provided with a truncated tubular portion 50, which is positioned in closed relation to the lower end of the hopper 7 to assist in directing the uncut product into the carriage. The blades 47 of the carriage are of a predetermined width and curvature, and have outer vertical exterior edges aligned with the peripheries of the top and bottom walls of the carriage and inner vertical edges terminating at the inner annular marginal edge of the top wall. The blades are arranged substantially radially and adjacent the peripheral portions of the carriage so that the products will readily flow outwardly into the spaces between the blades for engagement with the knives on the cutter assembly. The carriage, as shown by the arrows in FIGURES 2 and 4, is adapted for rotation in a clockwise direction and the blades, due to their curvature, present convex surfaces 51 which are engaged by the product, as depicted in FIGURES 4 and 17, to assist in holding the product against the supports and components associated therewith. The curvature of the blades is preferably such that the radial pressure of the blades against the product increases as the radial thrust, due to centrifugal force, decreases as the product is being sliced away. In other words, the convexly curved surfaces serve to gradually cam the product into a progressively firmer bearing relationship with the supports of the cutter assembly as the product is cut away.

The cutter or slicer assembly 4, which will now be described, embodies improved principles of design and construction and as depicted in FIGURES 3, 4 and 5, it is readily detachably mounted in a fixed or non-rotative position on a mounting 52. This mounting is stationarily detachably connected to the housing 21 through the tubular member 38. More particularly, the mounting includes a hub which is secured upon the radial flange 39 of the tubular member by screws 53 which extend through the hub and flange. The mounting is preferably of a dished spider-like character so that any juice, small cut portions or mashed portions of the product which may get in between the bottom wall of the carriage and the cutter assembly will flow or fall downwardly through openings in the mounting into a tank therebelow. The mounting includes a rim 54 having a crest portion defined by a pair of inclined or sloping surfaces which serve to substantially prevent accumulation of any of the product between the mounting and cutter assembly because it is important that the cutter assembly rest firmly on the mounting in a true concentric and horizontal position about the carriage.

The cutter assembly for cutting plain slices, as depicted in FIGURES 4, 5 and 7 through 14, comprises, among other things, an upper annular ring or mounting 55 and a plurality of eight corresponding curved supports 56 which are pivotally connected to the ring to constitute a unitary structure which can be readily placed on the mounting 52. The ring is provided with an annular rabbet 57 and eight upper pivot or dowel pins 58 respectively extend into aligned holes provided therefor in the ring and in the upper extremities of the supports. Eight lower pivot pins 59, corresponding to the pins 58, extend into holes provided therefor in the lower extremities of the supports and in the rim 54 of the mounting 52. The upper and lower pins are axially aligned with a pair located adjacent one vertical edge portion of each support to provide selective relative pivotal movement between the supports and ring so that a knife 59 carried by each support adjacent said edge can be accurately adjusted to obtain a desired cut of the product. The pins are preferably fixed on the supports and the lower pins also serve to locate the cutter assembly in proper operative position on the mounting. It will be noted that the upper extremities of the supports are disposed in the rabbet 57.

The means preferably utilized to adjust each support, as exemplified in FIGURES 4, 7 and 8, comprises providing the upper ring 55 of the cutter assembly with eight equally spaced radial threaded apertures which respectively receive screws 60 and providing the upper extremity of each support with a fixed pin 61. More specifically, each pin extends upwardly from an offset or ear formed on each support adjacent a vertical edge portion thereof circumferentially spaced from the pivots 58 and 59. Each of the screws 60 is provided with a head having an annular groove therein which receives a pin 61 in a manner whereby the screw can be manipulated to pivot the support in a horizontal plane about a vertical axis defined by the aligned pivots. The supports are thus selectively adjustable with respect to one another and may be readily locked after adjustment by means of vertically disposed screws 62 which extend through clearance slots in the upper ring of the cutter assembly and respectively engage threaded apertures in the supports.

The supports 56 are identical and the details of their design and construction and mode of mounting the knives and other components thereon will now be described. Each support is curved and provided with an inner arcuate gauging surface 63. These surfaces are identical and ranged in a predetermined circumferentially spaced relationship and the products are successively directed against these surfaces and to the knives by the carriage. The inner side of the vertical edge portion of each support adjacent the pivots is rabbeted and an elongate knife holder 64 is detachably secured in the rabbet by a pair of screws 65 which extend through the upper and lower ends of the holder into tapped holes provided therefor in the support as evidenced in FIGURES 9 and 10. The inner side of each holder is provided with an arcuate surface 66 which constitutes a continuation of the arcuate surface 63 of each support. It will be noted that a portion of the holder extends beyond the adjacent vertical edge portion of the support and that the inner side of the extended portion is bevelled and preferably provided with a concave recess or seat 67 which forms with the inner arcuate surface a pointed edge.

Each of the knives 159, as best shown in FIGURES 13 and 15, is rectangular and planar in shape, and secured in a concave recess 67 under stress. Each knife is constructed from relatively thin metal stock and is therefore resiliently flexible. One longitudinal edge portion of each knife is provided with a long bevel 68 and a short bevel 69 to provide a razor sharp edge. The opposite longitudinal edge portion of each knife is provided with longitudinally spaced holes 70 and headed pins 71 carried by the extended portion of the holder project into the holes and serve to locate the knife in the concave recess. A clamp 72, as clearly shown in FIGURES 7, 9, 10 and 14, is used to lock each knife in place. Each clamp includes a planar portion 73 provided with bayonet slots 74 and an offset portion 75 provided with apertures 76 and a bevel 77. Headed screws 78 carried by each support extend through the bayonet slots and when properly tightened force the clamp against the knife to flex the latter into the concave recess in order to firmly anchor it in place and locate its cutting edge in a predetermined position beyond the feather supporting edge of the support. It will be noted that the lower end of each clamp is notched at 79 to permit same to be slid into place and so that the heads of the locating pins 71 will enter the holes 70 of the clamp. The bayonet slots and screws thus facilitate detachable connection of the clamp to the holder for releasibly locking the knife in an operative position. Attention is directed to the important fact that the knives are inexpensive and can be discarded and that the clamps are coated with a layer of friction reducing material such as Teflon 80, as shown in FIGURE 14, so that the slices will readily slide off the clamps. In other words, the Teflon reduces the frictional resistance between the slices and clamps.

As alluded to above, one of the objects of the invention is to provide means which assists in partially compressing the product in order to firmly stabilize or control its position as it is conveyed by the carriage to the knives. The means preferably employed for this purpose, and best shown in FIGURES 12, 16 and 17, comprises an elongated pressure member 81 which is detachably secured by screws 82 in a rectangular rabbet 83 provided in the inner side of that vertical edge portion of each support disposed opposite the edge portion which carries the knife structure.

Each of the pressure members includes a planar base portion 84 provided with a plurality of equally spaced corresponding transverse ribs 85 forming squared channels or passages 86 therebetween. The outer faces of the ribs are disposed in the same plane, which plane is parallel to the plane of the base portion. Each member is also provided with a pair of longitudinally spaced threaded apertures located between pairs of adjacent ribs for detachably receiving the screws 82 which extend through the support with their ends being flush with the bottom surfaces of the channels as shown in FIGURE 12. The rabbets are so constructed that when the pressure members are respectively anchored therein the plane formed by the faces of the ribs will be slightly inturned from the inner arcuate surface 63 of the supports so that the inner marginal edge portions of all of the members which are closest to the knife edges will be located closer to the center of the cutter assembly than the adjacent arcuate surfaces 63. With this unique organization the products which are being rotated relative to the stationary cutter assembly by the carriage will first ride on one or more of the arcuate gauging surfaces of the supports and then onto the faces of the ribs which forces the products inwardly and this force, in combination with the centrifugal force, resulting from rotation of the products by the carriage, serves to compress the products and stabilize their position as they are introduced to the knives and being cut into slices thereby. Attention is also directed to the fact that the shorter bevels 69 on the knives face toward the center of the cutter assembly, substantially constitute continuations of the arcuate surfaces 63 and 66, and also assist in compressing the product. This arrangement for compressing the product serves to prevent splitting or cracking of the product ahead of the knife edges and as a consequence uniform slices are obtained. Any splitting or cracking of the product in advance of cutting results in rough or irregular cuts. The adjacent side surfaces of the ribs defining the channels 86 also serve to hold the products in place during the slicing or cutting operation. The convex surfaces 51 of the vertical blades or vanes on the carriage further contribute to stabilizing the products because each of these surfaces in combination with the inturned pressure members and arcuate surfaces of the supports substantially provide a plurality of V-shaped formations in which the products are forced or wedged against the arcuate surfaces and pressure members.

Of further significance, as pointed out above, is the fact that the ribs on each pressure member are of a size and so spaced apart that any foreign material, such as pebbles 87, shown in FIGURE 16, or sand, which has not been previously removed from the products by peeling and washing, may enter into the horizontal channels or passages 86 and pass outwardly through vertical discharge spaces or gate openings 88 between the supports along with the plain slices 89 which, as shown in FIGURE 17, are in the process of being cut. This feature is important because it materially reduces damage to the knives.

Referring to the operative relationship of the supports and components associated therewith as illustrated in FIGURE 16 of the drawing, the knives on the supports shown have cutting edges A, B, and C which are located exactly the same radial distance R1 from a center point X1 of the cutter assembly and the inturned edge portions or abutments D, E and F of the pressure members 81 on the supports are spaced the same radial distance R2 from the center X1. A product, such as a potato, is shown as engaging the inner arcuate surface 63 of one support and the arc G—H through the potato represents the path of the cut that the cutting edge B on the adjacent support will take when the potato rides onto the arcuate surface of this support. The radius R3 is the distance from this cutting arc or path G—H to a center X2 and is equal to radius R1. The thickness of the slice is the radial distance between the arcuate surface 63 including the arcuate surface 66 of a holder 64 between points A—J and the arc G—H. The arc G—H also represents the outer surface of the product which will slide on the inner arcuate surface 63 of the adjacent support and arcuate surface 66 of an adjacent holder thereon between points B—J after the product leaves the arcuate surfaces between points A—J of the first mentioned support and if the arc G—H is extended it will pass substantially through the points B—J of the adjacent support. The radius R4 is the distance from the inner arcuate surface of the adjacent support to a center X3 located concentrically with respect to center X1 and spaced from center X2. The radius R4 is also equal to R1 plus the thickness of the slice to be cut. The radius R5 is equal to the radius R4 and is also the distance from the arcuate surfaces 63 and 66 between points A—J and the center X2.

As alluded to above, the center X1 is the center of the cutter assembly. The supports carrying the knives and pressure members are selectively adjustable in a horizontal plane about their vertical pivotal axes defined by the pivot pins 58 and 59 so that the cutting edges A, B and C on the three knives shown and the cutting edges on the remaining five knives are equally spaced the same radial distance R1 from the center X1 and the abutments D, E and F of the pressure members shown and the abutments on the remaining five pressure members will be located the same radial R2 distance from the center X1. When the supports are properly adjusted by utilizing a suitable gauge, the centers X2 and X3 will all be located the same radial distance from the center X1. In other words, the centers X2 and X3 will be substantially concentric to the center X1. The distance between the centers X2 and X3 and the center X1 will vary depending on the extent that the supports are horizontally adjusted. For example, if the supports are adjusted to obtain thick slices or strips the centers X2 and X3 will be farther away from the center X1 and if they are adjusted to obtain thinner slices the centers X2 and X3 will be disposed closer to the center X1.

The radii R2 to the abutments D, E and F is slightly less than the radii R4 and R5 and these abutments are inturned with respect to the arcuate surfaces 63 of the supports and arcuate surfaces 66 of the holders thereon and as a result the product is sliding onto the pressure members from these arcuate surfaces will be forced inwardly generally toward the center of the assembly, which force in conjunction with the centrifugal force obtained by rotating the product about this center through the agency of the carriage will cause the product to be slightly compressed to stabilize its position as it is presented to the knives for slicing. These forces, in combination with the convex surfaces of the blades on the carriage, the ribs on the pressure members and the short bevels on the knives, all contribute to stabilize the product as it is being cut and also appreciably prevents the product from splitting or cracking ahead of the knife edges. With this unique setup, the product is held and slid smoothly from one support to another and is uniformly sliced during such movement and, as stated above, the knife clamps being coated with Teflon allow the slices to freely slide thereoff as they are being discharged from the supports through the vertical passages or gate openings 88 therebetween.

The cutter assembly for cutting corrugated slices or strips, as exemplified in FIGURES 18 through 25 of the drawings, will now be described. This assembly includes an upper ring or mounting 90 and a plurality of eight corresponding supports 91 (two are shown in FIGURE 18) which are pivotally mounted for adjustment in a horizontal plane relative to the ring and the mounting 52 in accord with the cutter assembly for cutting plain slices as above described. The inner side of each support is curved or arcuate and provided with a plurality of corresponding horizontally arranged corrugations 92 forming convex and concave surfaces. The inner side of one vertical edge portion of each support is provided with a vertical rectangular recess 93 and a holder 94 for a corrugated knife 95 is detachably secured in the recess by screws 96 which extend through the support and engage threaded apertures 97 provided in the ends of the holder as evidenced in FIGURES 18, 20 and 24.

The inner side of each of the holders 94, as shown in FIGURE 20, has a curvature substantially corresponding to the curvature of the inner side of each support to substantially constitute a continuation thereof. Each holder includes a relatively thick base portion 98 through which the screws 96 extend and a lateral or offset generally tapered portion 99 provided with corrugations as indicated at 100 in FIGURES 24 and 25 which receive and mate with transverse corrugations 101 formed in each of the knives 95. The corrugations 101 in the housing substantially correspond in size and shape to the corrugations 92 provided in the inner sides of the supports 91. The base portion 98 of each holder is provided with the threaded apertures 97 above referred to, with threaded apertures 102 and a chamfered or inclined portion 103. The width of each knife is predetermined and the edge opposite its cutting edge abuts the base portion 98 of the holder below the chamfered portion 103 as shown in FIGURE 20 so that its cutting edge will extend beyond the lateral corrugated supporting portion 99 of a holder. The knives are respectively detachably held in relationship with the lateral portions of the holders by clamps 104. Each knife is constructed from thin resiliently flexible metal stock and, as shown in FIGURE 23, is provided with a razor sharp cutting edge defined by a short bevel surface 105 and a long level surface 106. The knives are inexpensive and may be discarded after they become dull or damaged.

Each of the clamps, as depicted in FIGURE 18, includes a planar portion 107 and an offset portion 108 provided with corrugations 109. Screws 110 extend through the planar portion 107 of each clamp into the threaded apertures 102 as shown in FIGURES 20 and 24 for holding this planar portion against the base of a holder and the offset portion 108 against the chamfered portion 103 and the upper corrugated surface of a knife as shown in FIGURES 18 and 20. The clamps are preferably coated with Teflon 111 to reduce friction. The knives are preferably secured in place with their short bevel surfaces 105 facing inwardly of the cutter assembly and assist in compressing the product in the manner described above in connection with the knives 159.

The inner side of the vertical edge portion of each of the supports 91 opposite the edge which carries a knife is provided with a rabbet 112 in which a pressure member 113 is reversibly detachably secured by screws 114 which extend through the support and engage threaded apertures in the member, as shown in FIGURES 18 and 21. It is to be noted that the rabbets are preferably so constructed that when the pressure members are secured therein the inner planar surfaces of the pressure members substantially constitute straight continuations of the base portions of the corrugations 92 and are slightly inturned to assist in compressing the products in substantially the same manner that the pressure members 81 perform this function.

Attention is directed to the fact that the corrugated character of the knives allows pebbles, sand and other unwanted foreign material to find its way between passages formed by the corrugations and the pressure members and escape outwardly through the vertical spaces or gate openings between the supports.

Figures 26, 27, 28, 29:
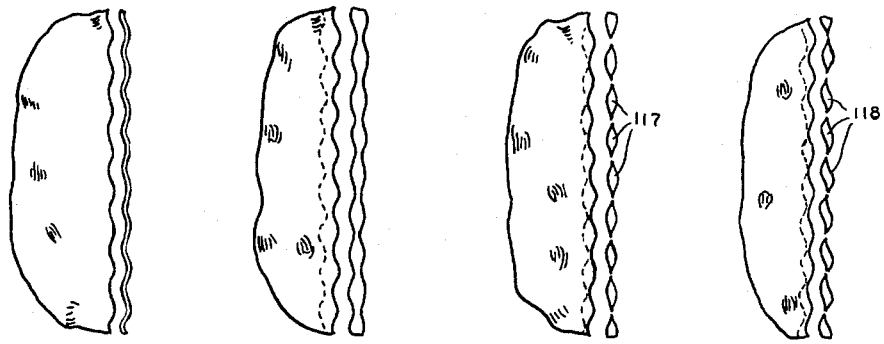
FIGURES 26 through 30 illustrate various forms of corrugated slices or strips which may be cut by adjusting the supports, which carry the corrugated knives, with respect to one another in a horizontal plane and at different elevations.

The supports 91, as alluded to above, may be adjusted in a horizontal plane with respect to one another and the upper ring 90 and the mounting 52 in substantially the same manner that the supports 56 can be adjusted for obtaining various forms of slices like those illustrated in FIGURE 26.

Provision is also made for adjusting the supports at different elevations and this is presently accomplished by utilizing spacers of variable thicknesses. As depicted in FIGURE 18, for example, a spacer 115 of a predetermined thickness is interposed between the upper part of the left support and the ring 90 and a spacer 116 of corresponding thickness between the lower part of the right support and the mounting. The upper spacer 115 may be located by the upper dowel or pivot pins and by the adjusting and/or locking screws and the lower spacer may be located by the lower pivot or dowel pins and screws (not shown) which may extend upwardly through the spacer into the bottom of the support. With this unique organization the alternate supports can be elevated to obtain a variety of different forms of slices and strips.

Figure 30:
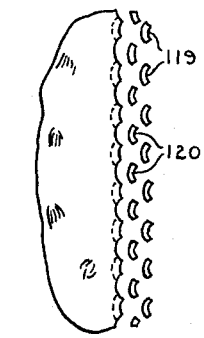

More particularly, the elevational adjustments and horizontal adjustments afford a setup whereby slices as depicted in FIGURE 27 and strips of the forms respectively exemplified in FIGURES 28 through 30 may be readily obtained. For example, the strips schematically shown in FIGURE 28, which may be referred to as a double convex form or ovate in cross-section, may be obtained by locating alternate supports at an elevation relative to the adjacent supports which is one-half the height of a corrugation so that a cut by one knife will produce a vertical row of strips 117 and a cut by the next knife, as indicated by the dotted line, will produce a succeeding row and a third knife will cut a third row like and at the same height as row 117.

The strips, schematically exemplified in FIGURE 29, are obtained by elevating the alternate supports at an elevation which is one-fourth the height of a corrugation of a knife so that a vertical row 118 will be cut by one knife, a succeeding row represented by the dotted lines by the next knife and a third row like the row 118 by a third knife and so on.

The strips illustrated in FIGURE 30 which may be referred to as concavo-convex in form, are obtained by adjusting the alternate supports horizontally and at heights one-half the thickness of a corrugation which will cause one knife to produce a row 119, a second knife a row 120, and a third knife a row indicated by the dotted lines located at the same elevation as row 119.

The two cutter assemblies above described may be interchangeably supported on the mounting 52 and this is readily accomplished by merely swinging the hopper 7 to one side as shown by the dotted lines in FIGURE 1, removing the guide 8, and then lowering the assembly selected so that the lower dowel or pivot pins fit into the holes in the rim of the mounting so that supports of the assembly directly engage the rim. Either assembly may be readily removed by lifting it vertically off the mounting.

Any suitable means may be employed to guide the product to be cut into the carriage 5, but as illustrated in FIGURES 1, 2 and 3, the hopper 7, utilized for this purpose, comprises an elongated housing or shell having a generally square shaped extremity and a vertical tubular extremity. More particularly, the squared extremity includes a vertical planar end wall 123 and side walls 124. The end wall is provided with an inclined upper portion or lip 125 and the side walls with similar inclined portions 126, which portions serve in reenforcing the hopper and assist in directing the product into same. As shown in FIGURE 3, the side walls 124 are generally trapezoidal in shape and have lower inclined edges provided with depending flanges 127. The hopper adjacent the junction between its extremities is provided with an intermediate inclined wall having a depending flange 128 which is similar to the flanges 127. These flanges and a depending flange (not shown) on the end wall 123 define an inclined discharge opening 129 and above this opening there is provided an inclined grate structure preferably comprised of a plurality of corresponding cylindrical rods 130 arranged in a parallel relationship on a pair of cross members 131 connected to the side walls of the hopper. The spacing between the rods is predetermined so that when the product is dropped into the hopper against the grate the product will slide downwardly into the vertical extremity of the hopper, while allowing any foreign material, such as stones, pebbles and the like, which have not been previously removed, to fall through the grate and discharge opening. A suitable container, such as a drawer (not shown), which is presently employed, is slidably mounted on the hopper under the grate for receiving such foreign matter.

The generally tubular extremity of the hopper includes a depending cylindrical portion 132 and the side walls of the hopper are joined or merged with the portion 132 by a curved wall 133. The tubular and squared extremities of the hopper are preferably reenforced to impart stability to the structure by utilizing a hollow member, which includes a top wall 134, a bottom wall (not shown) and a side wall 135, which walls are joined to the end wall 123 of the squared extremity, an adjacent side wall thereof, the cylindrical portion 132 and the curved wall 133. The hopper is also provided with an inclined wall 136 which generally constitutes a continuation of the grate so that the product will ride onto this wall after leaving the grate. Attention is directed to the important fact that the tubular and squared extremities of the hopper are offset with respect to one another and that the curved wall 133 is relatively large and includes a portion 137 adjacent the inclined wall 136 and cylindrical portion 132 so that as the product rides on the wall 136, the curved wall and adjacent portion of the cylindrical portion 132 will direct the product in a curved path substantially tangent to the portion 132 into the carriage and between the blades thereof. In other words, the products are fed substantially directly into the areas between the blades and thereby reduces to some extent the damage that would otherwise occur to the products if they were all fed directly into the central area of the carriage where they would strike the inner vertical edges of the blades.

The hopper is preferably provided with a handle or brace 138 bridging the upper portion of its side walls for swinging the hopper in a horizontal plane to the full line operative position shown in FIGURES 1 and 3 with the cylindrical portion 132 vertically aligned with the carriage and cutter assemblies or to an inoperative position at one side thereof as depicted by the dotted lines in FIGURE 1 and the full lines in FIGURE 2. It will be noted that the cylindrical portion 132 is adapted for disposition directly over the frusto-conical portion 50 of the carriage.

The hopper may be supported for movement in any one of several ways, but as shown in FIGURE 3, it is mounted on a vertical post or pillar 139. The upper extremity of the post is secured in a suitable manner, such as by welding, in one corner of the squared extremity of the hopper and the lower extremity of the post is journalled in a cylindrical socket 140 having a base flange 141, through which screws 142 extend into a mounting plate fixed on the frame. The upper end of the socket is provided with a boss 143 and a fitting 144 is detachably secured thereto by screws 145 so that a rounded nose or detent portion 146 of the fitting extends upwardly above the socket for selective engagement with concave seats 147 and 148 provided on a circumferential portion of a collar 149 detachably secured to the post as evidenced in FIGURE 3A. When the nose 146 registers with the seat 147 the hopper is held in an inoperative position and when disposed in the seat 148 the hopper will be held in the operative position.

As noted above, a relatively large generally U-shaped member 13 projects laterally from the frame 1 and supports the guide 8 and the funnel 9. More specifically in this regard, the upper edge of the funnel is reenforced by a ring 150 which bears against the upper edge of the member 13 and the guide 8 which is frusto-conical in shape has a radial flange 151 which rests upon the ring 150 and is detachably held thereon by a plurality of three circumferentially spaced lugs or fingers 152 on the guide which extend downwardly about the ring and curved portion of the member. The guide is thus held in a concentric relation about the carriage and cutter assembly. The upper end of the guide is preferably provided with an axial extending cylindrical flange 153 located about the upper extremity of the carriage and the funnel with a clearance opening 154 for the tubular casing 20. The funnel about the opening is reenforced with an arched member 155 welded thereto.

The slices or strips engage the guide or ring 8 as they are ejected from the cutter assembly and the funnel constituting a continuation of the guide assisted in directing them into a tank as mentioned above. In order to assist in preventing the slices or strips from adhering to the guide and funnel the latter are preferably provided with dimples, as shown in FIGURE 3, which present a multitude of convex surfaces adapted for engagement by the slices or strips.

In addition to the structure above described it is to be understood that if found desirable the pressure members may be designed and constructed so that their inner surfaces may be inclined with respect to their bottom surfaces as distinguished from constructing the rabbets to inturn the inner surfaces.

Also, it is to be understood that the various components of the machine may be constructed out of any material suitable for the purpose for which they are designed.

Figure 31:
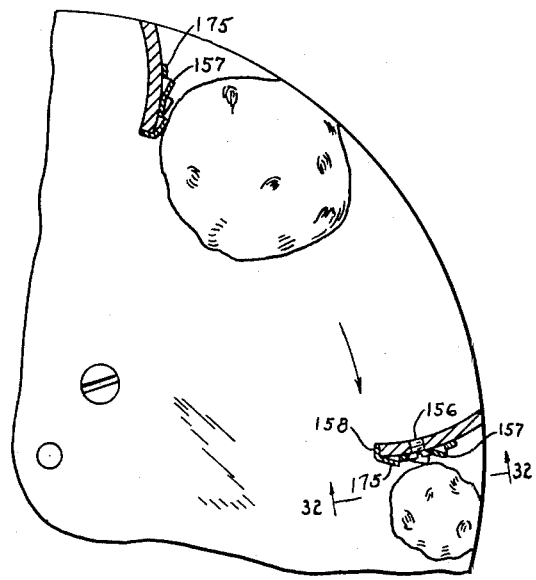
FIGURE 31 is a partial top view of a modified carriage depicting fittings which can be detachably connected to the blades or vanes of the carriage to augment stabilization of the product while it is being cut.
Figure 32:
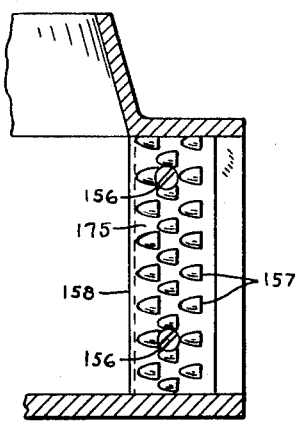
FIGURE 32 is a partial elevational view taken substantially on line 32—32 of FIGURE 31 and shows certain details of the fittings.

Moreover, if found desirable, the blades of a carriage such as the one shown in FIGURES 31 and 32 may be provided with fittings 175 secured to the blades by screws 156. More particularly in this regard, each of the fittings is of a length to fit between the bottom wall and the ring portion of the carriage as shown in FIGURE 32 and includes a portion provided with series or rows of struck out semi-conical portions to present a plurality of staggered crescent shaped marginal edges or abutments 157, constituting friction producing surfaces, facing the outer periphery of the carriage for engaging products of different sizes shown in FIGURE 31. Each fitting is also provided with an offset portion 158 which engages the inner vertical edge of each blade. The abutments on the fittings in combination with the inner curved surfaces or the supports, pressure members, and short bevels of the knives serve to stabilize the position of the product while it is being conveyed to the knives by the carriage.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. A method of slicing a food product which comprises conveying the product in an annular path by a plurality of blades to stationary knives at a speed to produce an appreciable centrifugal force and then applying a secondary force to divert the product inwardly from said path and in conjunction with the centrifugal force to substantially normalize its position while it is being cut.

2. A method of slicing a product into pieces which comprises rotating the product in an annular path about an axis toward a plurality of circumferentially spaced knives, and then successively diverting the product inwardly of said path into the knives for cutting.

3. A method of cutting a product into pieces which comprises rotating the product horizontally by an impeller in an annular path toward a plurality of circumferentially spaced stationary vertical knives, and then successively forcing the product inwardly of the path into successive engagement with the knives for cutting.

4. A method of cutting a product into pieces which comprises rotating the product in an annular path into successive engagement with a plurality of circumferentially spaced knives and successively diverting its course of travel inwardly to produce in combination with centrifugal forces resulting from its rotation a stabilizing effect on the product while it is being cut by the knives.

References Cited in the file of this patent

UNITED STATES PATENTS

| | | |
|---|---|---|
| 2,195,879 | Urschel et al. | Apr. 2, 1940 |
| 2,923,337 | Jouin | Feb. 2, 1960 |

FOREIGN PATENTS

| | | |
|---|---|---|
| 715,329 | France | Sept. 22, 1931 |
| 781,627 | France | Feb. 25, 1935 |